GEOPHYSICAL SURVEY APPARATUS AND METHOD OF PROSPECTING

Filed June 15, 1953 5 Sheets-Sheet 1

Inventor

DONALD W. SLATTERY

By Hill, Sherman, Meroni, Gross & Simpson Attys

July 25, 1961 D. W. SLATTERY 2,994,031

GEOPHYSICAL SURVEY APPARATUS AND METHOD OF PROSPECTING

Filed June 15, 1953 5 Sheets-Sheet 2

Inventor

DONALD W. SLATTERY

By Hill, Sherman, Meroni, Gross & Simpson Attys

GEOPHYSICAL SURVEY APPARATUS AND METHOD OF PROSPECTING

Filed June 15, 1953 5 Sheets-Sheet 3

Inventor
DONALD W. SLATTERY
By Hill, Sherman, Meroni, Gross & Simpson Attys

GEOPHYSICAL SURVEY APPARATUS AND METHOD OF PROSPECTING

Filed June 15, 1953 5 Sheets-Sheet 4

Inventor
DONALD W. SLATTERY

By Hill, Sherman, Meroni, Gross & Simpson Attys

July 25, 1961 D. W. SLATTERY 2,994,031

GEOPHYSICAL SURVEY APPARATUS AND METHOD OF PROSPECTING

Filed June 15, 1953 5 Sheets-Sheet 5

Inventor
DONALD W. SLATTERY
By Hill, Sherman, Meroni, Gross & Simpson Attys

United States Patent Office 2,994,031

Patented July 25, 1961

2,994,031

GEOPHYSICAL SURVEY APPARATUS AND METHOD OF PROSPECTING

Donald W. Slattery, P.O. Box 924, Chadron, Nebr.

Filed June 15, 1953, Ser. No. 361,739
16 Claims. (Cl. 324—6)

The present invention relates to a geophysical surveying apparatus and method of electrical prospecting and particularly to electrical systems and methods for prospecting subterranean deposits or other sources of oil or gas or the like.

The petroleum industry being constantly in search of new sources and new deposits and accumulations of oil and gas has fairly well depleted shallow deposits and accumulations, oil and gas accumulated relatively near the surface of the earth, and therefore has been forced to turn to attempting to discover oil and gas accumulations deeper within the earth. The detection of deeper accumulations however is a considerably more difficult task by heretofore known processes and systems since these processes and systems are not as accurate nor as positive in their intelligence indication as is desired.

Early and well known systems employing seismographs and gravity indicators have been found to be almost useless for detecting oil and gas accumulations at a depth of about 10,000 feet more or less below the earth surface. The lack of utility of these systems in detecting deep wells and the like obtains from many reasons such as inherent limitations of the phenomena employed to give the desired indications and from the numerous variations in subterranean rock strata, mineral deposits and faults and the like.

Upon finding their fairly reliable shallow depth detector systems unreliable for detecting deep deposits the industry has since been somewhat handicapped in prospecting for new sources and accumulations of oil and gas. It naturally followed therefore that new systems and methods became the object of a great deal of experimentation in order to satisfy the needs of the industry. This experimentation was conducted and attempted along numerous lines, the most effective and accurate of which was electrical.

Electrical systems affording geophysical prospecting and surveying had already been in extensive use and were highly developed for the detection of metallic ore body deposits within the earth but most of these systems were more or less ineffectual for detecting fairly deep subterranean deposits of oil or gas. Nevertheless, because of generally assumed simplicity and relatively low cost in use, experimentation continued at a high level for the discovery of electrical systems and processes for geophysical prospecting and surveying for subterranean accumulation of oil and gas. Needless to say numerous systems and processes were developed which were more or less successful and more or less accurate in their detection results.

Numerous of these systems employed electromagnetic wave propagation and reception and attempted to detect intelligible variations in the parameters of the waves received. These systems largely attempted to attain success along two distinct lines: one of which was an intensity measurement of either continuous waves or reflected pulses of high intensity, short time duration direct current discharges, and the other of which was principally an attempt at a time determination for reflected high intensity short time duration direct current discharges. As stated, many of these systems were more or less accurate. Most of these systems were however modelled after previously known metallic, conductive, ore deposit detection systems and were unreliable for the detection of deep subterranean accumulations of oil or gas in that their results varied in accordance with intermediate deposits of metallic ores.

Another type of system which has been developed employs a variable frequency propagation which, due to varying reflection, absorption and refraction values for various subterranean strata may give some indication of the character of the several successive layers or the interfaces therebetween. These systems also have been only more or less successful for the detection of deep subterranean deposits and accumulations of oil or gas. The inaccuracies here also frequently obtain due to faults and the metallic ore bodies and the like which are intermediate oil or gas deposits and the surface of the earth.

All of the aforementioned systems were also burdened with another difficulty which frequently left even large deposits substantially undetected. This difficulty arose from the incapability of the systems employed and the processes followed to differentiate between the generated wave and the received wave (or pulses as the case may be) at the receiver. Frequently the received wave or pulse was wholly drowned in the transmitted wave as the same were received substantially simultaneously at the receiver; the ratio of their intensities being on the order of several hundred to one; further, the signal coming from the ground varies over a range of about five to one.

I have discovered however that the electromagnetic wave being received from the ground can be separated from the electromagnetic wave being received through the air or across the surface of the earth from the transmitter and that extremely valuable and accurate results in the detection of subterranean deposits of oil or gas obtain from such a separation. What is even more important is that I have discovered that in the presence of subterranean deposits of oil or gas there is a detectable and measurable phase shift between these two waves. Further, I have discovered that electromagnetic waves can be substantially completely separated even though they are of substantially the same frequency if they are of differing polarization and/or if they are received from substantially different directions. By the present invention preferred embodiments of which are hereinafter further described, I have embodied these discoveries.

Before discussing the details of the present invention and the preferred embodiment of the present invention described hereinbelow it is best that the reader have an understanding of the principles of the present invention irrespective of whatever their true theoretical explanation may be.

As stated, I have discovered that there is a detectable and/or measurable phase shift between the wave received from the ground at the receiver and the wave received directly from the transmitter either through the air or along the surface of the earth. If the system is taken into an area where there is an oil field and if phase readings are taken at a few points off the structure and then are carried into the oil field with measurements being taken at numerous points along the way, the phase of the signal picked up from the earth will begin to shift very definitely and will shift the very most at the top of the anticline. The reader should understand of course that the terms "structure" and "anticline" herein refer to the shale and/or salt beds underlying and overlying oil and/or gas accumulations at subterranean depths within the earth. Subterranean accumulations of oil and/or gas are most usually found in such surroundings particularly with the upper and lower shale beds or salt beds or salt water beds slightly domed or raised at for example about the center of the accumulation. These rises in the beds are referred to as "anticlines."

I have found that phase shift variations, most readily detected by separation of the transmitter propagated wave from the earth emanated wave, but also otherwise detectable, is the most reliable method of geophysical prospecting for oil and/or gas since the indications are sharp and there is almost no interference from strata intermediate the surface and the oil and/or gas.

With respect to possible theoretical explanations of these phase shift phenomena, it may quite possibly be explained on a basis of "reflection," but this is highly doubtful. I had originally supposed that the results of my discovery and experimentation and tests had been due to "reflection" but have since found that such an explanation is most improbable as the correct one.

The exact explanation for these phase shifts which occur over oil fields is not known but inasmuch as certain types of oil fields and structural uplifts are accompanied by phase shifts in certain directions, that is to lead or to lag; there is here a definite clue as to exactly what is occurring in the subsurface stratas. On granite highs and on reef type highs, the phase shift is toward the lag whereas on oil bearing stratagraphic traps and oil bearing domes of small closure, the phase shift is toward the lead. In the case of stratagraphic traps, the concentrations of oil or gas appearing in the permeable limestones or sandstone or shale beds acts like a dielectric layer in a gigantic condenser, the plates of which are the electrically conductive shale beds, etc., overlying and underlying the oil bearing formation. Currents set up in the earth, in the manner hereinafter described in detail in accordance with the present invention, circulate across these formation layers and the presence of such a gigantic condenser in the earth with oil or gas dielectric between its plates causes a shift in the phase of these currents; that is, causes a leading phase shift which when detected gives an accurate determination of the presence of oil and/or gas accumulations. A somewhat less accurate but also important action which also occurs is that the presence of oil seems to have a marked effect on the amount of current that flows in the earth thereby causing detectable and measurable variations in the intensity of the signal received from the earth at the receiving station. I am at present unable to give any explanation for the observed fact that a reef high containing oil and gas, causes the phase to lag very markedly, often more than 20° but it is no doubt due to the large differences in the electrical conducting characteristics of the oil-filled reef as contrasted with the surrounding formations.

Irrespective of whatever the explanation may be however I have offered the above only as a possible answer and do not intend that it should in any way limit the scope of my invention and discovery.

To detect the signal or wave arriving from the ground depths in order to determine its relative phase shift and intensity with respect to the originally transmitted wave has heretofore been a relatively difficult task since transmitter and receiver systems constructed in accordance with heretofore known beliefs etc. have resulted in a general mixing of these waves and an effective, almost complete, blanketing of the wave received from the ground by the wave received directly from the transmitter since the waves received from the ground are extremely weak. As an important feature of the present invention I have developed a system whereby a transmitter and/or receiver are substantially completely and almost absolutely directional with the attending result of separation of waves arriving from relatively different directions and/or having relatively different polarization even though they may be electromagnetic waves of substantially the same frequency. By this invention one may with ease detect relative phase shift and intensity variations between such relatively different waves.

This wave separation system has many valuable uses but will be described hereinbelow with geophysical survey systems and processes as a preferred example of its utility. Another example of the valuable utility of this wave separation system is that it may be used in areas where two or more stations are operating on about the same wave length and normally interfere with each other to the extent that reception cannot be enjoyed at all. By the system of the present invention they may be separated and received individually clearly and distinctly with practically no interference from each other.

It is therefore an important object of the present invention to provide method and apparatus for the separation of electromagnetic waves of substantially the same frequency or wave length and received from relatively different directions and/or having relatively differing polarization.

Another object of the present invention is to provide method and apparatus for the separation of electromagnetic waves of substantially the same frequency through an antenna receiver system embodying the principles of the present invention.

It is still another object of the present invention to provide method and apparatus for the separation of electromagnetic waves of substantially the same frequency through a receiver and/or transmitter tuning system.

Another important object of the present invention is to provide method and apparatus for accurate and definite geophysical surveying and prospecting by relative phase shift detection and/or measurement.

It is another important object of the present invention to provide method and apparatus for geophysical surveying and prospecting by substantially absolute phase shift detection and/or measurement.

It is a still further and important object of the present invention to provide process and apparatus for geophysical prospecting for subterranean accumulations of oil or gas or the like through electromagnetic wave transmission and reception and amplitude detection of the waves received.

It is still another object of the present invention to provide a method and apparatus for geophysical surveying and prospecting enabling earth surface plotting and mapping and/or depth determination for subterranean deposits and accumulation of oil or gas or the like through electromagnetic wave propagation, transmission and reception.

It is still another object of the present invention to provide receiving antenna system for nullification and separation of one electromagnetic wave from another electromagnetic wave of the same frequency.

It is still another object of the present invention to provide process and apparatus for geophysical surveying and prospecting substantially irrespective of the depth of the subterranean deposits and accumulations of oil and gas or the like.

Still other and further objects, features and advantages of the present invention will become apparent from the foregoing general discussion as well as from the following detailed description of preferred embodiments of the present invention, appended claims, and accompanying sheets of drawings which form an integral part of this specification and disclosure, in which like reference numerals refer to like parts, and in which:

Figures 11, 12, 13, 14, 15:
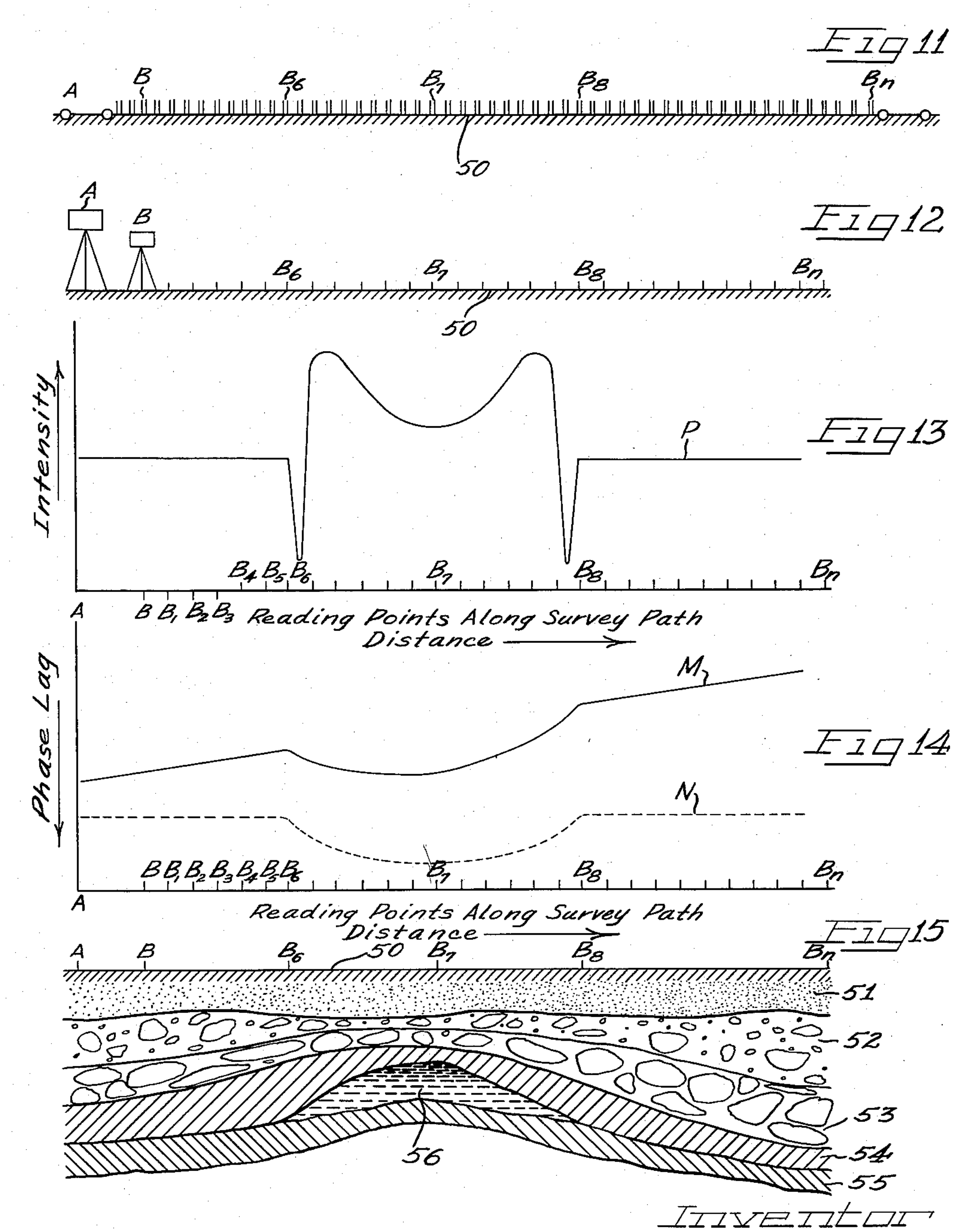
FIGURES 11 and 12 illustrate various patterns of transportation of the systems of the present invention in accordance with the principles thereof.

FIGURES 13 and 14 illustrate phase reading curves and an intensity reading curve which obtain from conducting geophysical surveying and exploration in accordance with the principles of the method of the present invention and while employing systems of the present invention in traversing an oil or gas accumulation; and FIGURE 15 is a diagrammatic illustration of a cross-section through the earth where there exists a subterranean accumulation of oil and/or gas.

As was suggested generally above I have discovered that there is a detectable and/or measurable phase shift between the wave energy arriving at a receiving station directly from the earth and the wave energy arriving at the receiving station via direct radiation from the transmission station. I have found that this phase shift varies markedly when a subterranean accumulation of oil and/or gas is traversed at the earth's surface by a transmitter and/or receiver, either of which may be stationary with the other of the two being moved or both may be moved, and this phase shift, usually accompanied by a variation in intensity of the signal being received directly from the ground, is, to the best of my knowledge and belief, the most accurate method of earth surface plane mapping of subterranean deposits and accumulations of oil and gas. In accordance with the principles of the present invention I accomplish this mapping by detecting the phase shift between these signals and the variations thereof and have been able to map with ease areas wherein the reef highs have been virtually undetectable by other methods and systems.

From the foregoing general description of the character of the present invention it should be clear that the parameters of phase variation and intensity variation are best measurable when the wave received directly from the ground and the wave received directly from the transmitter are separated; as pointed out above the wave received directly from the ground is extremely weak as compared to the wave received directly from the transmitter. The low intensity and low signal strength of the wave received directly from the ground may be explained in any of several ways and although positive verification does not now appear to be available the most likely explanation is that the wave arriving from the ground or directly from the earth exists by virtue of induction and re-induction processes effected between the transmitter and the earth and between the earth and the receiver.

The stated induction and re-induction processes are probably more of combined wave propagation-induction-and repropagation effects than otherwise but have been stated as above for simplicity of expression in accordance with the most likely and most logical explanation of the principles underlying the present invention. Thus, wave propagation at the transmitting station induces currents within the earth which in turn generate and emanate wave energy from the earth at the receiving station. There is an attending passage of the electromagnetic waves and currents over the shale or salt or rock beds overlying and underlying the oil or gas accumulation and an attending leading or lagging phase shift with a maximum change at the top of the anticline obtaining; this appears to be the most logical explanation for the observed phenomena.

Figures 1, 2, 3:
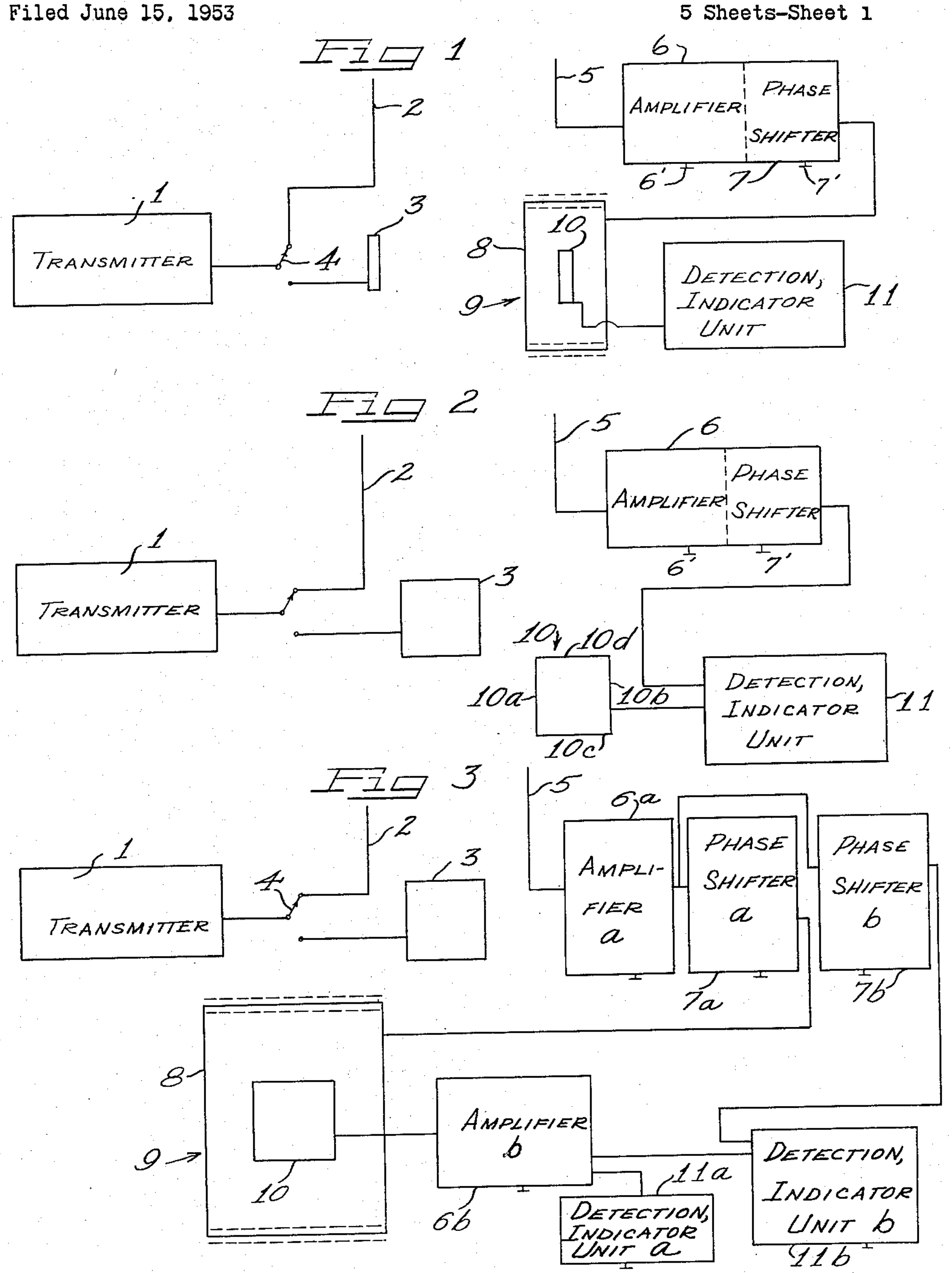
FIGURE 1 is a block schematic diagram of a preferred embodiment of the present invention illustrating a substantially complete system for geophysical surveying and prospecting for subterranean deposits and accumulations of oil or gas or the like in accordance with the principles of the present invention.
FIGURE 2 is a block schematic diagram of a system similar to the system of FIGURE 1 but embodying modifications thereof in accordance with the principles of the present invention.
FIGURE 3 is a block schematic diagram of still another embodiment of the present invention which embodiment is capable of greater detail of intelligence than the systems of FIGURES 1 and 2.

One preferred system embodying the principles of the present invention and capable of operating and performing in accordance with the method of the present invention is illustrated in FIGURE 1 in block diagram. In this system a transmitter 1 may be selectively connected to a vertical rod antenna 2 and a loop antenna 3 through a double throw switch or the like 4. At the receiving station a vertical rod antenna 5 is connected through a controllable amplifier 6 and phase shifter 7 to the outer loop 8 of a pair of loops indicated generally at 9. The inner loop 10 of the pair of loops 9 is connected to an amplifier, detector, output meter or the like 11.

The operation of this system is quite simple in that it merely involves setting up the system with the several antennas positioned in planes substantially perpendicular to the plane tangent to the earth surface at their location and with a spread between the transmission station and the receiving sufficient to minimize direct magnetic coupling of the transmission antenna with the receiving antenna. Thereafter the transmitter 1 is connected to the vertical rod antenna 2 through the double throw switch 4 so that there radiates at vertical antenna rod 2 electromagnetic waves of substantially pure vertical polarization. These vertically polarized waves are received at the receiving station by the vertical rod antenna 5 and the vertical arms of the loops 8 and 10 and the amplifier 6 and phase shifter 7 are then adjusted for a null indication on the detection, indication unit 11. The signal at the output of the phase shifter 7 is thus balanced against the signal produced in the vertical arms of the loops 8 and 10 to produce the null indication. It should be noted that there is substantially no transmission of energy into the ground from antenna 2. The amplifier is controllable preferably from complete cut off through maximum amplification and the phase shifter 7 is preferably controllable through 360° by controls 6' and 7'.

With the system of FIGURE 1 adjusted as described the switch 4 is thrown or moved to a position connecting the loop antenna 3 to the transmitter 1 and thereafter readings of phase shift between the signal arriving at the ground and the signal arriving at the receiver may be detected and measured and the intensity of the signal arriving at the ground may be measured also.

Figure 8:
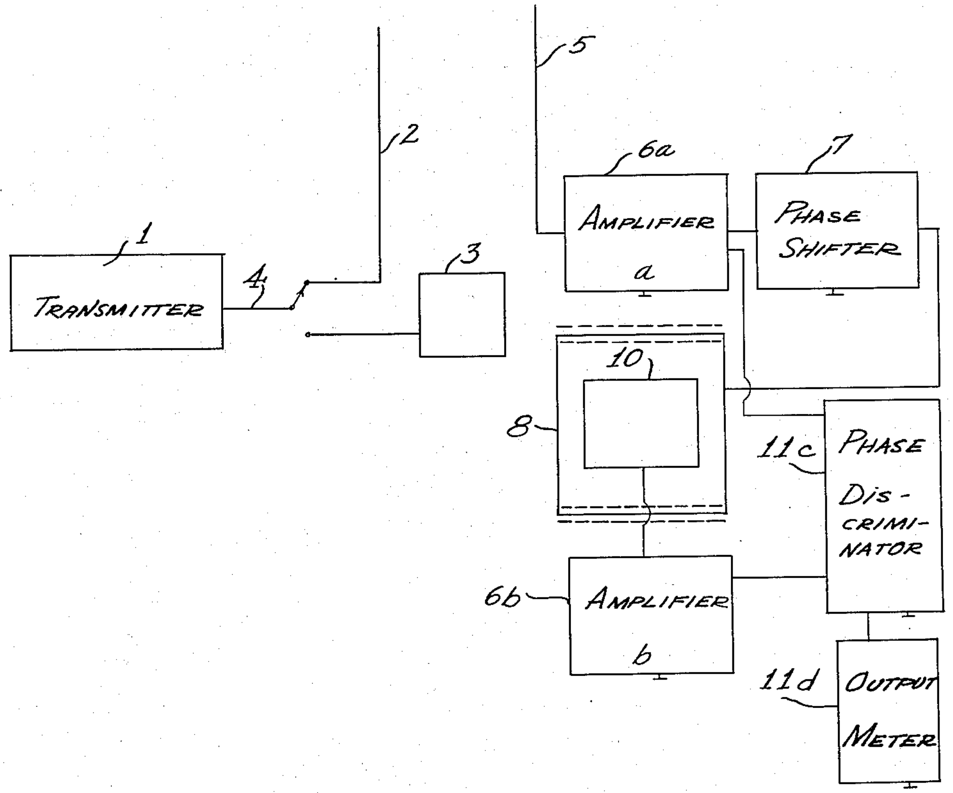
FIGURE 8 is a block schematic diagram of still another diagram of still another embodiment of the present invention illustrating another mode of phase determination and detection.
Figures 9, 10:
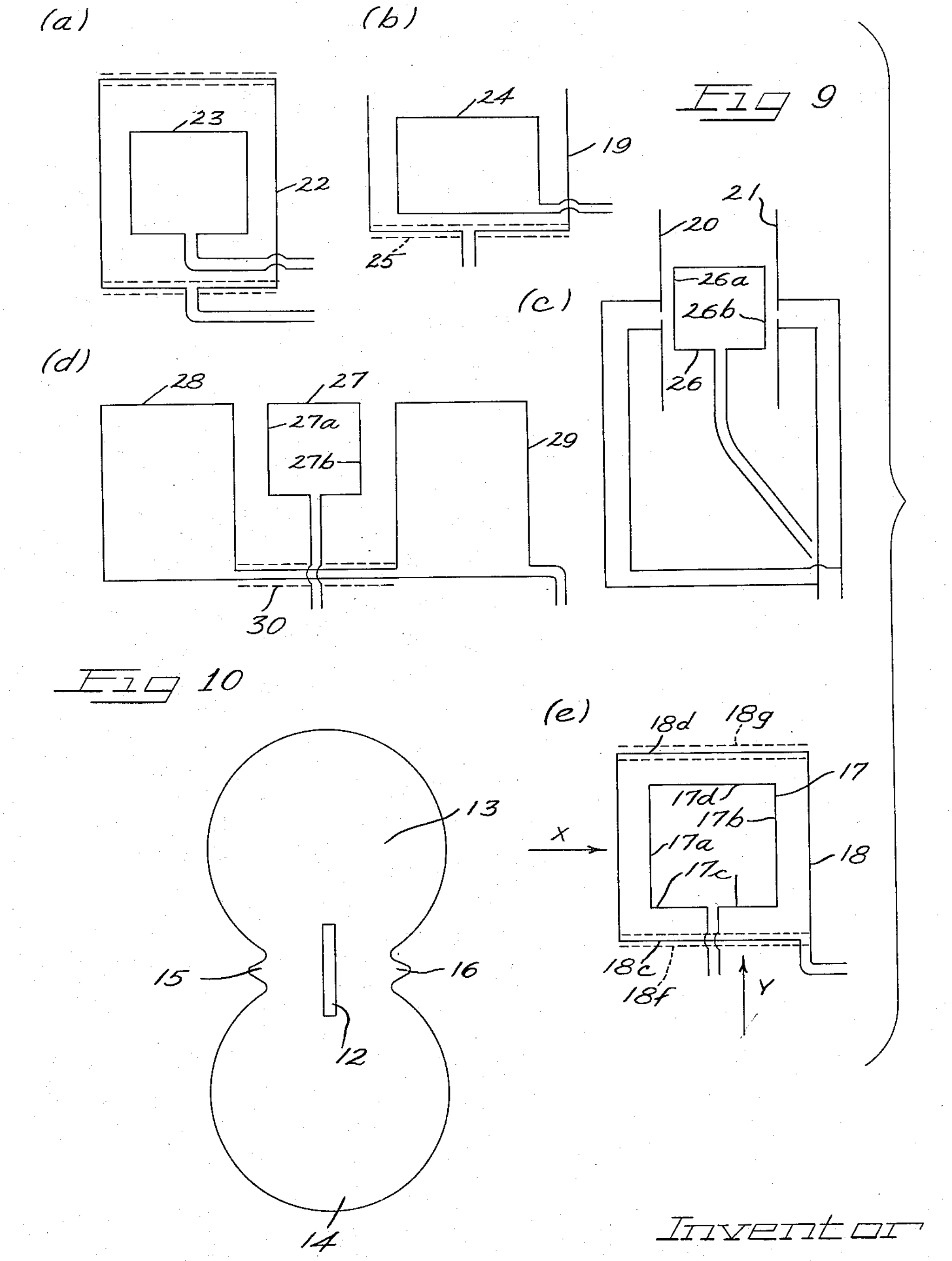
FIGURE 9 illustrates schematically several forms of antenna receiver systems embodying the principles of the present invention.
FIGURE 10 is a top plan view of the wave propagation pattern of a loop antenna which is positioned adjacent to the surface of the earth and the plane of which is substantially vertical or perpendicular to the tangent plane to the earth in that vicinity.

To understand why this system operates as it does and how it operates however the reader's attention is directed to FIGURES 9 and 10. As already explained, for proper quantitative and accurate analysis of a wave which is received from the ground, and as a part of the present invention, there should be a separation of the wave received from the ground and the wave received directly from the transmitter, as the wave which is received from the ground directly results from transmitting at the transmitting station an electromagnetic wave which induces wave energy in the ground and the wave energy in the ground is retransmitted thereby to the receiving antenna system at the same frequency. When a transmitting antenna is disposed substantially adjacent to the surface of the earth the wave energy propagated therefrom includes a vertically polarized component even though in free space the propagation pattern of the antenna is such that the wave energy would be substantially completely horizontally polarized. This phenomena obtains with loop antennas the planes which are vertical, from horizontally disposed dipoles, and from adcock antenna systems as well as from most other types of antenna systems. In FIGURE 10 there is illustrated the wave pattern of a loop antenna the plane of which is vertical and which antenna is disposed relatively close to the earth surface. It is immaterial whether this antenna is round or square. In free space the loop antenna 12 would propagate wave energy in a figure 8 pattern; the figure 8 pattern in section would be designated by the lobes 13 and 14. When the loop 12 is positioned substantially adjacent the earth surface however the figure 8 pattern is distored, probably by eddy currents, to include an extra pair of lobes 15 and 16 radiating outwardly from the sides of the loop. The two extra lobes are of importance in the measurements and operation of the present invention since they are vertically polarized and thus constitute vertically polarized components such as discussed above which are propagated even though in free space the propagation pattern of the antenna would be such that the wave energy would be substantially completely horizontally polarized. The wave energy which is induced into the earth from the primary lobes radiating from the loop is substantially purely horizontally polarized.

Since substantially all antenna systems for propagating a horizontally polarized wave also propagates a vertically polarized component it is this vertically polarized component which masks or buries the horizontally polarized waves received from the ground at the receiving station. I have therefore developed the antenna systems of FIGURE 15 whereby maximum selectivity between waves from different directions or of different polarization is most easily accomplished.

The antenna design of FIGURE 9 (*a–e*) can all be used for the rejection of vertically polarized waves arriving from a horizontal direction while not interfering with the pick up of horizontally polarized signals arriving from the vertical angle such as from the ground. In FIGURE 9*a* there is illustrated a system embodying the principles of the present invention which includes a pair of loop antennas designed for use in conjunction with the receiver system of the present invention and readily adaptable to accomplish the rejection and reception and separation hereinabove described. The aerials of FIGURE 9*a* are shown as being coplanar but it is well within the principles of the present invention that these loops may be either parallel or perpendicular or disposed at some intermediate variably controllable angle as desired in accordance with the principles of the present invention.

FIGURE 9*b* indicates that the combination of a loop antenna with an adcock antenna is well within the concepts and the principles of the present invention and readily adaptable for use in conjunction with the systems of the present invention to conduct measurements and prospecting in accordance with the principles and methods of the present invention. FIGURE 9*c* illustrates a similar system showing the combination of a loop with a pair of dipoles vertically disposed on opposite sides of the loop. Here again of course the loop need not be disposed in the plane of the dipoles, but may be horizontally rotated to any desired position.

FIGURE 9*d* indicates a three loop system which is well within the principles of the present invention and may be rotated as indicated hereinbefore with regard to the illustrations in FIGURES 9*a*, *b* and *c*.

Returning now to the general discussion of rejection of wave energy of one polarization for selected reception of wave energy of another polarization, the reader's attention is directed specifically to FIGURE 9*e*. FIGURE 9*e* illustrates a pair of receiving loops substantially identical to those of FIGURE 9*a* in which an inner loop 17 is substantially concentrically disposed within an outer loop 18. It is of course not necessary that these receiving antennas be loops, nor is it necessary that they be of the same character since either or both could be adcock antennas such as the adcock antenna 19 of FIGURE 9*b* or vertical and/or horizontal dipoles such as the dipoles 20 and 21 of FIGURE 9*c*. So too, in the following description although certain characteristics and factors will be attributed to the inner antenna loop 17 and certain others attributed to the outer antenna loop 18 of FIGURE 9*e*, these may be readily reversed with the characteristics of the inner loop 17 being attributed to the outer loop 18 and vice versa.

Presuming for purposes of example and illustration that the inner loop 17 and the outer loop 18 are disposed coplanar in a vertical plane then signals arriving from a horizontal direction, direction X, induce an alternating voltage in sides 17*a* and 17*b* of the inner loop 17. This current flows through the entire coil 17. To nullify the current induced by the signal arriving from direction X, a current is established in outer loop 18 of such a phase and intensity as to induce in the inner loop 17 a voltage exactly opposite to that already flowing in the loop 17. The second current, the current for nullifying the current induced in the loop 17 from the signal arriving from direction X is brought into the loop 18 from another source such as the vertical rod antenna the amplifier and phase shifter mentioned in FIGURE 1 and further described below. Now suppose that another signal arrives from direction Y and induces a voltage in sides 17*c* and 17*d* of the inner loop 17. Since a voltage has already been induced in inner loop 17 on all sides thereof from outer loop 18, if the signal induced by the waves arriving from direction Y in sides 17*c* and 17*d* of inner loop 17 happen to be out of phase with that induced by the current flowing through outer loop 18, then elliptical polarization will occur. This is detrimental to accurate results inasmuch as the signal which has been induced into the earth from the transmitted wave is propagated from the earth surface at the receiving station in the same plane of polarization as the signal inducing that wave at the transmitter. In other words, the receiving aerial should be electrically oriented the same as the transmitter in order to pick up the radiation. If the receiving equipment electrically distorts the incoming wave front by eliptically polarizing it, then incorrect results will be had in both phase and intensity measurements. To prevent this from happening and to prevent magnetic coupling between the horizontal sides and outer loop 18, sides 18*c* and 18*d*, heavy shields of highly conductive material preferably metal, can be installed over the horizontal segments of the outer loop aerial 18. This will greatly reduce the magnetic field of these horizontal segments and prevent coupling of the same with the horizontal segments 17*c* and 17*d* of the inner loop 17. Actual measurements on test equipment show a reduction of this magnetic field of the horizontal segments to about 1/30 or less that of the vertical segments.

The magnetic shields on the horizontal segments 18*c* and 18*d* of the outer loop 18 are indicated at 18*f* and 18*g*. The isolation of the horizontal portion of the loop may also be accomplished by separation through elongation of the outer loop 18, as shown in FIGURE 9*a* wherein the outer loop 22 is shown elongated and in addition horizontally shielded. Thus, the receiver antenna system and array of FIGURE 9*a*, in accordance with the principles of the present invention, is readily adaptable to receive signals of a given polarization or from a given direction selectively separating them from signals of another polarization or from another direction.

Similarly, the system of FIGURE 9*b* illustrating an inner loop antenna 24, similar to the inner loop 23 of FIGURE 9*a* and the inner loop 17 of FIGURE 9*e*, in cooperation with the adcock antenna 19 having a horizontal shield 25, is operable in accordance with the principles of the present invention. In a like manner the system of FIGURE 9*c* having a loop 26 similar to the inner loop above described is cooperatively coupled to pairs of dipoles 20 and 21 which are coupled substantially exclusively to the vertical sides **26*a* and 26*b* of the loop 26; the loop 27** of FIGURE 9*d* has vertical sides **27*a* and 27*b* coupled to the laterally disposed loops 28 and 29 and is horizontally shielded by the shield 30 about the horizontal line interconnecting the loops 28 and 29** so that this system too may operate in accordance with the principles of the present invention.

To most succinctly review the above explanation of the principles of the present invention as they apply to the separation and signals arriving from different directions or having different polarizations or both of such differences, the object here is to substantially nullify one of the waves while receiving the other and avoiding elliptical polarization where the same would naturally occur due to the design of the antenna array. This is accomplished in the system shown in FIGURE 9 by inducing a signal of the proper intensity and phase into the primary receiving antenna, the antennas 17, 23, 24, 26 and 27, which will reject the unwanted signals substantially in toto while permitting reception of the desired signal. In systems of this sort it now may be seen that signals arriving from two different horizontal directions may be separated in the same manner and that they may be selectively received by a turning and possibly retuning of the antenna. For example, with regard to FIGURE 9*e*, 180° horizontal rotation of the outer loop 18 will bring in the signal from direction X with double strength. This can be accomplished electrically by reversing the two terminals connecting to loop antenna 8.

Returning now to the system of FIGURE 1 if the loop aerial 3 at the transmitter is energized then a vertically polarized wave is transmitted to the receiver through the air along the earth surface. If however the system was first tuned with the transmitter 1 connected to the vertical antenna 2 so that the vertically polarized wave received by the antenna 5 is so amplified and phase shifted and fed into the outer loop 8 that it will induce a voltage in the vertical arms of the inner loop 10 to completely or substantially completely nullify and balance out for a null reading on the output meter vertical polarized waves received from the direction of the transmitter, then through this balanced receiving arrangement the receiver will not detect the signal arriving via the surface route as it will be vertically polarized.

Any energy induced into the ground however which in turn causes a secondary magnetic field to be set up in the earth will be caused to vary in its intensity and phase by the there existing subsurface conditions, subterranean accumulations of oil and gas and the like, and will in its own turn induce a signal into the receiving loop aerial. This signal, coming from the earth, will be horizontally polarized as was the signal which induced it at the transmitting loop aerial. Being horizontally polarized, it will not induce a signal into the vertical rod aerial 5 nor in the vertical legs of the loops 8 and 10 but will act only upon the horizontal turns of the receiving loop aerial. Therefore the receiving aerial system will remain balanced insofar as the vertically polarized signals from the transmitter are concerned but will be unbalanced insofar as horizontally polarized signals from the earth are concerned. With this balanced arrangement receiving only the horizontally polarized waves from the earth the output meter which has formerly been at a null position will now read the intensity of the signals arriving from the earth undisturbed by signals received directly from the transmitter. If the phase shifter 7 is now controllably varied by such means as a manual control system, to give a minimum reading on the output of the meter then the variations in the phase shifter, which may be a calibrated one, will give a resultant phase shift reading. Readjustment of the amplifier 6 may bring the output meter reading back to a null position if that reading is so desired and calibration of the gain control by any convenient means such as an index dial will give an arbitrary indication of the amplitude of the signals arriving from the earth.

It was stated above in connection with an explanation of how and why the null reading and separation are to be effected. The receiving aerial should be electrically oriented the same as the transmitter in order to properly pick up the radiation. This is illustrated in FIGURE 1 by showing the transmitter loop aerial in a plane perpendicular to the plane of the paper and the primary receiving loop 10 parallel therewith, also in a plane perpendicular with the plane of the paper. There are numerous variations in this, which may be had however with the aerial 3 and the aerial 10 being coplanar, that is pointed at each other, or being positioned in parallel planes otherwise than in the plane of the paper or perpendicular to the plane of the paper so long as they are so oriented electrically as to permit signal pick up in accordance with the principles of the present invention at the receiving station. It is important however that in using the system illustrated in FIGURE 1 for the receiving antenna array that the outer loop 8, the secondary loop whether it is the inner loop or the outer loop, be pointed as directly as possible at the transmitter since such an arrangement gives the best results even though other planes of orientation for the secondary loop 8 are permissable and operable within the scope of the present invention.

Numerous modifications and variations of the above described system are available without departing from the scope and spirit of the present invention. One such modification is illustrated in FIGURE 2 wherein the transmitting station system and receiver station system are substantially identical to those of FIGURE 1 except that the outer or secondary loop 8 of FIGURE 1 has been eliminated and the signal output of the vertical antenna 5, the amplifier 6 and the phase shifter 7 are directly connected to the detector and output meter 11 (which may include an amplifier) where that signal is mixed with the signal received from the loop 10. In FIGURE 2 the systems are also illustrated with the transmitting loop 3 and the receiver loop 10 positioned coplanar or pointed at each other. The mode of operation of this system is substantially identical to the mode of operation of the system described and illustrated with regard to FIGURE 1. First the transmitter 1 is connected to the vertical rod antenna 2 through the double throw switch 4. The wave energy transmitted from the vertical rod antenna 2 is essentially vertically polarized and received principally by the receiver vertical rod antenna 5 and the vertical legs **10*a* and 10*b* of the loop 10 wherefrom they are passed to a mixer of the amplifier, detector and output meter 11. The amplifier 6 and phase shifter 7 which, as described, are variably controllable to extreme limits therefor and which may be arranged in any order either with the amplifier first or with the phase shifter preceding the amplifier, so adjust and so modify the signal received from the vertical rod antenna 5 that a null reading is effected on the output meter 11**.

Now with the output meter 11 adjusted to a null reading through proper control of the amplifier 6 and phase shifter 7 the switch 4 is thrown to connect the transmitter 1 to the transmitting loop 3. Wave energy transmitted from the loop 3 will have a vertically polarized component which will be rejected at the receiver station system if the system has been adjusted for a null with respect to energy arriving from the direction of the transmitter, and will have horizontally polarized components which will induce electromagnetic wave energy and current into the earth which will in turn propagate wave energy to the loop antenna 10. This latter wave energy propagated from the earth surface will be horizontally polarized and received almost exclusively on the horizontal legs 10*c* and 10*d* of the loop 10 giving amplitude, phase indications on the output meter 11 in accordance with the subterranean conditions. Index variation of the phase shifter 7 to a minimum reading on the output meter 11 will give an indication of the phase shift between the received signal and the transmitted signal and index variation of the amplifier 6 will give an indication of the intensity of the signal arriving from the earth.

In all of these modifications, including the modifications hereinabove described and those which will be hereinafter described it should be understood that numerous types of antennas may be employed such as properly polarized dipoles and adcock antenna systems.

Another method of geophysical exploration and surveying within the principles of the present invention and with systems substantially similar to those illustrated in FIGURES 1 and 2 and described above may be employed when it is desired to measure only relative phase shift variations and relative intensity variations from point to point and place to place along the transistory survey for mapping subterranean deposits of oil and/or gas accumulations in an earth surface plane map. In this modified arrangement and method a single transmission antenna such as the loop 3 or an adcock or a horizontally disposed dipole is maintained connected to the transmitter 1 in all stages of operation and may be disposed parallel to the primary receiving antenna or coplanar therewith and pointed directly thereat. The receiver antenna array may include either the primary receiving antenna alone or such an antenna system as any of those of FIGURE 9 with the primary receiving antenna properly electrically oriented and properly geometrically oriented with respect to the transmitting antenna as described above. Of course, the receiving antenna could also be a horizontal dipole if so desired.

With this arrangement the amplifier and phase shifter are adjusted by manual control therefor, or otherwise as desired, to a null reading on the amplifier, detector and output meter and successive readings taken in the above described manner with either the transmitter maintained in a fixed position and the receiver moved to traverse the transitory survey path or vice versa, or with both the transmitting station and the receiving station moved along the transitory survey path.

Once the system has been adjusted for a null reading then variations of the reading along the transitory survey path or line of survey will give relative readings with respect to the subsurface conditions at the original point of null setting. Since it is preferred that the controls 6' and 7' for the amplifier 6 and phase shifter 7 have variation indicia markings thereon, re-adjustment of the system as described above will readily indicate variations in amplitude and phase shift relative to the original position reading either simultaneously or individually as desired.

Still another variation which may be made upon the systems of FIGURES 1 and 2 without departing from the spirit and scope of the present invention is to directly connect the amplifier 6 and phase shifter 7 sequentially, in any desired order, to the transmitter 1 via a transmission line, thereby avoiding setting up another receiver antenna such as the vertical rod antenna 5 of FIGURES 1 and 2. The mode of operation of this system and the method of geophysical surveying and exploration and prospecting would be the same with this modification as it was with either the systems of FIGURES 1 and 2 or the other modification described.

In the hereinabove described systems and methods and in numerous of the hereinafter described methods and systems the final indicator has been represented as an amplifier, detector and output meter 11. Such a final indicator as the amplifier, detector and output meter 11 is only representative of the types of indicators and signal mixing systems which may operatively and profitably be employed within the principles of the present invention to conduct efficient and accurate and improved geophysical surveying, exploration and prospecting. Numerous other forms of indicating means are available and may include a simple null indicator and mixer or a phase meter or phase discriminator and indicator or some such device as an oscilloscope with an accurate time base sweep or with a synchronously keyed time base sweep and with or without photographic systems which may be of the single picture variety or which may be of the time increment photographing variety such as those adapted to take pictures at a rate of one per second or one per two seconds, more or less as desired. Still another form of indicator which may be gainfully employed within the spirit and scope of the present invention is the tuned amplifier and output meter. In addition, recording meters and indicators of the several varieties mentioned may also be included within the system. Some of these types of indicators will be further described below in connection with some of the hereinafter described systems and modifications thereof.

Although the above described systems give good results and accurate indication of the phase shift variations which occur as the systems traverse subterranean deposits and accumulations of oil and/or gas, some of these systems are designed to give only relative indications and in some situations do not give as readily fine results as may be desired. Much more acute readings may be had by employing more elaborate systems such as those of FIGURES 3 and 4 and modifications thereof.

The systems of FIGURES 3 and 4, and the modifications thereof and the methods by which the same may be employed to conduct accurate and successful earth surface plane mapping, for geophysical surveying and exploration and prospecting purposes, give results which in addition to the results attainable through the use of systems such as those in FIGURES 1 and 2 and the modifications thereof hereinabove described and also indicate true phase shift variations and the true phase shift between the signal arriving from the earth and that arriving directly from the transmitter at the receiving station; also true amplitude readings for the amplitude of the signal arriving from the earth are better attainable with the systems and methods of FIGURES 3 and 4.

The system of FIGURE 3, which is basically similar to the system of FIGURE 1 has a transmitter 1 which may be connected to either a vertical rod antenna 2 or the principal radiation antenna 3, herein illustrated as a loop antenna, through a double throw switch 4. At the receiving station, the more elaborate setup includes connecting the vertical rod antenna 5 to amplifier 6*a* and a phase shifter 7*a* in that sequence, and to the outer loop 8 of the antenna array 9 having an inner loop 10 connected to an amplifier 6*b* the output of which feeds into a first detector and output meter 11*a* and a mixer, detector and output meter 11*b*. In addition, a signal is taken from a point between the amplifier *a*, 6*a*, and phase shifter *a*, 7*a*, and is fed through a second phase shifter *b*, 7*b*, to the mixer, detector and output meter 11*b*. For purposes of comparison and for the reader's convenience it is made evident that the system of FIGURE 3 is substantially identical to the system of FIGURE 1 except that an additional phase shifter, phase shifter *b*, 7*b*, and an additional detector and output meter, either 11*a* or 11*b*, have been supplied to the arrangement of FIGURE 1 for the system of FIGURE 3. So, too, the mode of operation and method of prospecting with the system of FIGURE 3 is basically very similar to the method employed with the system of FIGURE 1.

The preferred method of operation of the system of

FIGURE 3 is such that the transmitter 1 is first operated through the vertical rod antenna 2 and the essentially vertically polarized wave propagated therefrom is received by the vertical legs of the loops 8 and 10 and by the vertical rod antenna 5 of the receiver system. The receiver system is then tuned to a null through operation of the completely controllable amplifier *a*, 6*a*, and phase shifter *a*, 7*a*, so that the energy in the loop 8 is magnetically coupled to the loop 10 through the vertical legs of each thereof to nullify substantially completely all wave energy received from the direction of the transmitter 1 and the vertical rod antenna 2 connected thereto by the double throw switch 4 thus giving a null reading on the detector and output meter 11*a*. Thereafter the double throw switch 4 is moved to connect the transmitter 1 to the principal radiation antenna 3. The principal radiation antenna 3 will propagate electromagnetic energy as described above to induce a substantially horizontally polarized wave into the ground which will repropagate horizontally polarized energy which will in turn be picked up by the horizontal legs of the principal receiving antenna 10. Proper manipulation of the phase shifter *b*, 7*b*, will give an accurate indication on the mixer detector output meter 11*b* of the phase shift between the signal arriving from the earth, the signal arriving directly from the transmitter and the detector and output meter 11*a* will give an accurate indication of the amplitude of the signal arriving from the ground. It should be noted that the phase shifter *b*, 7*b*, should be initially adjusted while antenna 2 is in operation so as to have a properly phased output thereof which would correspond to a datum with which the phase of the ground wave can be compared when antenna 3 is in operation.

By separating the amplitude measurement and the phase measurement substantially absolute measurements of each may be obtained with the maximum simplicity afforded by the system. From the foregoing it should be clearly understood that the operation of the system of FIGURE 3 may be employed to give relative indications as well as absolute indications if the same is so desired but obviously absolute readings from point to point along the transitory survey path will give more accurate and more easily defined plots, greatly simplifying the cartography involved.

It should also be understood in connection with the system of FIGURE 3 that numerous variations in indicators, such as those outlined and suggested above, are available for operable use in conjunction with this system. So, too, various antenna arrays such as those also suggested hereinabove are available for operable ust in conjunction with the transmitting station and the receiving station.

Numerous modifications and variations of these more acute systems with accompanying variations in the method will of course present themselves to those skilled in the art but will nevertheless be within the true spirit and scope of the present invention. One such variation is illustrated in FIGURE 4 which in addition to modifying the system of FIGURE 3 in the manner in which the system of FIGURE 2 is a modification of FIGURE 1 also is a modification of the system of FIGURE 3 in that the phase shifter *b*, 7*b*, is interposed between the amplifier *b*, 6*b* and the second mixer, detector and output meter 11*b* and a signal is taken from a point between the amplifier *a*, 6*a* and phase shifter *a*, 7*a* directly to the mixer, detector and output meter. The operation of this system is in fact, substantially identical to the mode of operation in the method described above in connection with FIGURE 3 and therefore will not be repeated here. It will be noted that in the system of FIGURE 4, a signal from the amplifier 6*a* and a signal from the phase shifter *b*, 7*b* are fed to the unit 11*b* and the phase shifter *b*, 7*b* may be adjusted to obtain a null indication in the indicator 11*b*, the position of adjustment of the phase shifter *b*, 7*b* being then an indication of relative phase. In the alternative, the unit 11*b* may be a phase indicator of a known type which will directly indicate the relative phase of the signal from the amplifier 6*a* and the signal from the phase shifter *b*, 7*b*. The system of FIGURE 4 being similar to the system of FIGURE 2 couples the output of the phase shifter *a*, 7*a* directly to amplifier *b*, 6*b* in lieu of employing the double antenna array system 9, or as shown in FIGURE 9 and extensively discussed in conjunction therewith. Numerous other modifications of these systems are available within the spirit and scope of the present invention and among such other variations are the use of the single principal receiving antenna 10 in the system such as that of FIGURE 3. Other modifications include modifications in the types of antennas employed such as adcock antennas and dipole antennas and their disposition as to whether they are disposed parallel or co-planar or pointed at each other etc. as more fully described above. Still another modification of this system involves employment of the second phase shifter such as the phase shifter *b*, 7*b*, in either the position shown therefor in FIGURE 3 or the position shown therefor in FIGURE 4 and the omission of the output meter or detector 11*a*. Still other modifications involve the numerous variations in detectors etc. as outlined above.

One important modified system embodying the principles of the present invention bearing resemblance to the hereinabove described systems is the system illustrated in FIGURE 8 wherein the transmitting station is essentially identical to those described hereinabove, having a transmitter 1 which may be connected to either a vertical rod antenna 2 or a principal transmission antenna 3 through a double throw switch system 4. The receiving station of the system illustrated in FIGURE 8 may be successfully employed with any of the hereinbefore described antenna systems but preferably uses the double loop symmetrical array of FIGURES 9*a* and 9*e* with both the loop 8, having shielded horizontal legs or arms, and the loop 10 pointed directly at the principal transmitting antenna 3 so that all three antennas are substantially coplanar. Now with this set up, the receiver vertical rod antenna 5 is connected to a first amplifier *a*, 6*a* which is in turn successively connected to a phase shifter 7 and the secondary receiver aerial 8. The output of the amplifier *a*, 6*a*, is also connected to a phase meter or phase discriminator 11*c* where the signal from the amplifier *a*, 6*a* will serve as the reference signal. The output from the primary receiving antenna, the loop 10 in this illustration, is fed to an amplifier *b*, 6*b*, and then to the phase meter or phase discriminator 11*c* where accurate phase determinations, substantially absolute in character, are made. A volt meter 11*d* has been shown connected to the output of the unit 11*c* to illustrate that when employing a phase discriminator in preference to a phase meter an indicator such as a vacuum tube volt meter should be connected to the output of the phase checking unit 11*c*.

The mode of operation and the method of employing this system is somewhat different than those described above in that it is preferred to take two readings on either the indicator volt meter 11*d* or phase meter if the same is employed at 11*c*, at each point along the transitory survey path in the earth surface plane. The first of these readings is made with the vertical rod transmission antenna 2 connected to the transmitter 1 and the system would be so varied through control of the amplifier *a*, 6*a*, and phase shifter 7 for a null reading on the phase meter or for a null reading on the volt meter if a discriminator is employed. Thereafter, the switch 4 will be thrown to connect the transmitter 1 to the principal radiation aerial 3 and the phase variation may be read directly on the phase meter 11*c* or on the volt meter 11*d* if the unit 11*c* is employed as a phase discriminator.

It is not essential of course that two readings be taken at each point where measurement is taken along the transitory survey 10 but that is a preferred method of employment of this system. It will be understood by the reader of course that the aforementioned phase meter is preferably a direct reading type of instrument where the aforementioned discriminator is a balanced voltage type of system which becomes unbalanced and has a voltage output when out of phase with the reference voltage, voltage is introduced into the same. These types of instruments and systems are well known in the art and do not per se form a part of the present invention and therefore have been shown in block diagram form only as part of the systems of the present invention.

Other types of indicators such as cathode ray oscilloscope etc. may be employed in the above system if so desired.

Another type of system which embodies the principles of the present invention but which is quite different from the hereinabove described systems, superficially, is illustrated in block diagram form in FIGURE 7. This system is somewhat similar to modified forms of FIGURES 1 and 2 above for obtaining relative phase shift variations from point to point along the transitory survey path in the earth surface plane. One of the important features of this embodiment of the present invention is that the earth itself is employed as part of the primary transmitting aerial loop and as part of the primary receiving aerial loop.

In detail, a preferred embodiment employing this principle has a transmitter 1 connected to probes 40 which are aligned and inserted vertically into the earth as part of the principal transmission antenna. The remainder of the loop on the principal transmission antenna is illustrated in arcuate broken line 42 and is most simply described as the resultant energy path through the earth between the probes 40. At the receiving station a vertical rod antenna 5 is connected to an amplifier 6 and phase shifter 7 of any desired sequence but controllable respectively from about cut off to about maximum amplification and through about 360° of phase shift. The output of the amplifier and phase shifter is fed to an indicator system such as a tuned amplifier and output meter. The receiving system also has a pair of probes 41 which are staked into the earth and electrically aligned with the probes 40 at the transmitting station; that is, the line between the staked probes 41 and the line between the transmission probes 40 should be either parallel or colinear. A broken arcuate line 43 represents the resultant earth circuit completion of the receiver loop just as the arcuate broken line 42 represented the resultant completion of the transmitter loop in the earth circuit. The operation of this system and the method of employing the same to determine principally phase variations as caused by subterranean accumulations of gas and oil as a transitory earth plane survey line is traversed, is substantially identical to the methods described above in conjunction with FIGURES 1 and 2 and modified forms thereof as described except instead of simply moving the transmitter station and/or receiver station manipulation of the system of FIGURE 7 requires uprooting the probes 40 and/or 41 and restaking the same into the earth at a new survey point.

Figure 7:
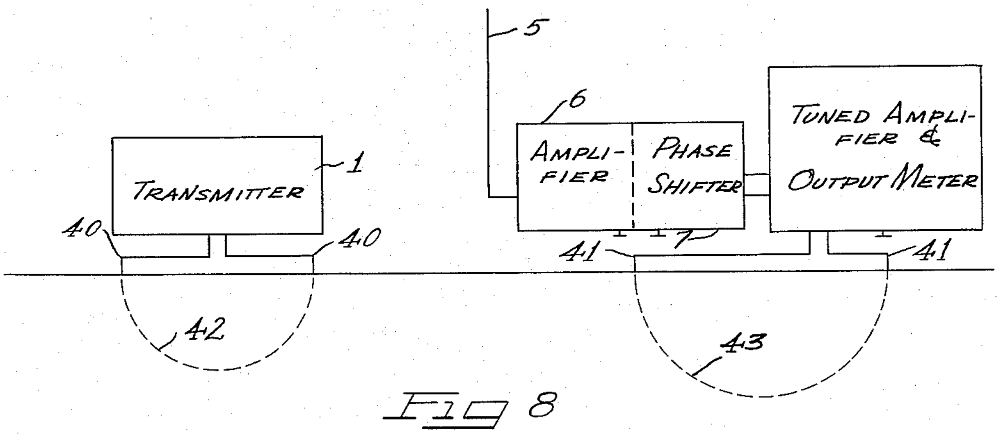
FIGURE 7 is a block schematic diagram of still another embodiment of the present invention illustrating another system for geophysical prospecting and surveying in accordance with the principles of the present invention wherein the transmitter and receiver antennae are so coupled to the earth that the earth forms part of each antenna.

In connection with the system of FIGURE 7 it should be understood that if the terrain requires or if it is so desired for any other reason, use of the vertical rod antenna 5 at the receiving station may be avoided by interconnecting the amplifier 6 and phase shifter 7 to the transmitter 1 with a transmission line. This modification may also be of considerable value with respect to most all of the hereinbefore described systems when it is desired to take readings with the transmitter and the amplifier reasonably close to each other, for example, more or less than about a quarter of a mile to about one-half of one mile since through the use of a transmission line and the amplifier and phase shifter control it is possible to so reduce the transmitted signal for reference purposes that it will not seriously hamper proper phase shift determination and detection of the signal arriving from the earth.

Figures 4, 5, 6:
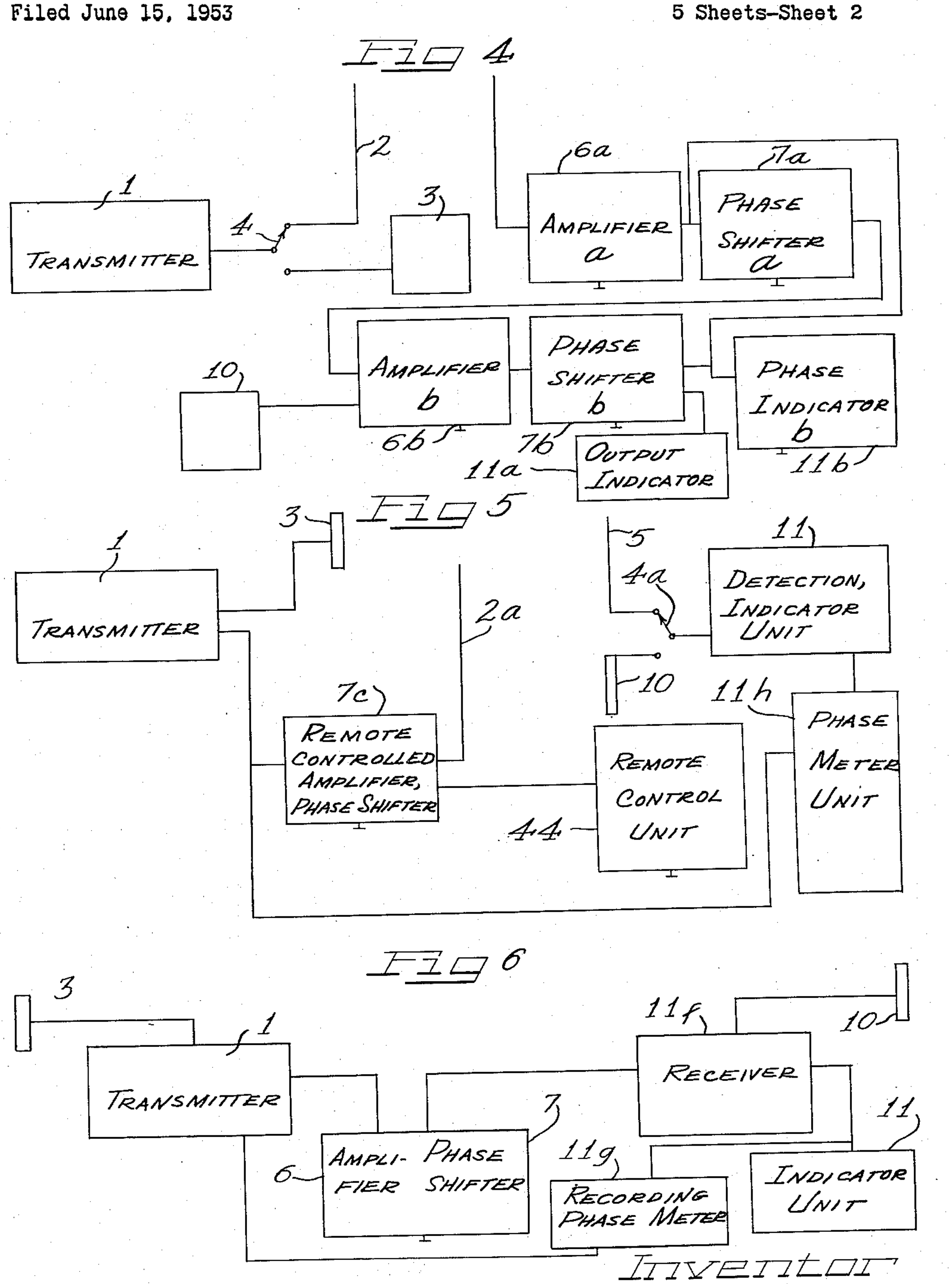
FIGURE 4 is a block schematic diagram of a modified system substantially similar to that of FIGURE 3.
FIGURE 5 is a block schematic diagram of another embodiment of the present invention in which separation and nullification of the wave to be received at the receiver directly from the transmitter is accomplished through control of the transmitting station.
FIGURE 6 is a block schematic diagram of another embodiment of the present invention and which embodiment is particularly adaptable for geophysical surveying and exploration and prospecting with the use of airborne system.

In FIGURE 6 still another type of system embodying the principles of the present invention is disclosed. The system of FIGURE 6 is one that is readily adaptable and principally designed for use in aircraft for conducting geophysical surveying prospecting and exploration while flying over the survey area. In this preferred embodiment of a system for surveying by flying over the area to be investigated the transmitter 1 has its output connected to the principal propagating antenna 3 which is preferably a loop antenna but may be a dipole system or adcock system. The transmitter 1 is also connected from its output to an amplifier 6 and phase shifter 7 each of which are controllable as described hereinabove with respect to other embodiments of the present invention, and the output from the controlled amplifier and phase shifter is fed to the receiver **11*f*. The output of the receiver is connected to an indicator unit 11 which may be a recording output meter or volt meter or cathode ray oscilloscope with or without photographic equipment or a similar system as described above. A principal receiving antenna 10 which is also preferably of the loop type but may be of other desired types, is connected to the input of the receiver and electrically oriented with respect to the principal propagating antenna 3 as desired. To complete the system of this preferred embodiment a recording phase meter or some similar system is connected between the output of the transmitter and the output of the receiver. The method of surveying for subterranean deposits of oil and gas with this system is very similar to the hereinabove described method in that with the antennas 3 and 10 properly electrically oriented and mounted with their planes or plane perpendicular to the earth surface tangent plane and with these antennas mounted at substantially maximum spacing as at the port and starboard wing tips respectively the gain controlled amplifier and phase shifter are adjusted for null reading on the indicator unit 11 and recording phase meter or the like 11*g*** while the plane is flown at a very high altitude, an altitude of minimum or no response from the earth or coupling with the earth. Thereafter the plane is flown at a very low altitude over the area to be tested and the tests are taken at definite intervals. Various methods can be used to mark the location of the plane such as radar, loran, shoran or lorac simultaneously with taking phase variation and amplitude variation reading.

This method and system is particularly useful for mapping extremely large areas or areas which are virtually inaccessible to ground crew and forms an important part of the present invention.

It will be recalled from earlier portions of this specification that one of the principal objects of the present invention is the detection of subterranean deposits and accumulations of oil or gas through the detection of the phase shift of waves passing across such accumulations. It will also be recalled that one of the important methods of detecting this phase shift lies in the nullification of the air transmitted waves or earth surface transmitted waves from the transmitter to the receiver, or the separation of the earth surface transmitted waves or the air transmitted waves and waves emanating from the earth at the receiving station. Another important method of accomplishing this separation lies in dual transmission of out of phase, principally vertically polarized, waves whereby the waves effectively cancel each other leaving only reception of the horizontally polarized waves induced into and emanating from the earth. Apparatus for effecting this method is diagrammatically illustrated in FIGURE 5.

In the system of FIGURE 5 the transmitter 1 is connected directly to a principal propagating antenna 3 and is further connected to a grounded vertical antenna **2*a* through a remote controlled phase shifter 7*c***. At the receiving station an amplifier, detector and output meter 11 is selectively connected to either a vertical rod antenna 5 or a principal receiving antenna 10 which is properly electrically oriented as hereinabove described with respect to the principal propagating antenna 3 through a double throw switch or the like 4*a*. The output of the amplifier and detector stages of the indicator unit 11 is also connected to a phase meter unit here designated as 11*h*. In this embodiment of the present invention the phase meter 11*h* also has an input via a signal transmission line directly from the transmitter 1 and a remote control unit 44 is connected electrically and/or mechanically to the phase shifter 7*c* for controlling the phase of the output and energy propagated from the vertical rod antenna 2*a*. The remote control unit itself is preferably positioned immediately adjacent to the indicator units 11 and 11*h* for expediency.

In the method of conducting geophysical surveys and explorations by the employment of such systems as the system of FIGURE 5 the switch 4*a* is first thrown to a position connecting the vertical rod antenna 5 to the indicator units 11 and 11*h*. Upon energization of the transmitter 1 wave energy will be propagated from both the principal propagating antenna 3 and the grounded vertical antenna 2*a* with the principal propagating antenna emanating both horizontally polarized waves and vertically polarized waves as described above in connection with FIGURE 10 while the grounded vertical antenna 2*a* will emanate electromagnetic energy of almost exclusively vertical polarization. The vertical rod antenna 5 at the receiving station is sensitive however substantially only to vertically polarized waves so that manipulation of the remote control 44 for amplitude and phase control of the waves to be emanated from the vertical rod antenna 2*a* to the phase shifter amplifier unit 7*c* will accomplish substantially complete neutralization of all vertically polarized waves emanating from the transmission station and thereby effect null readings on the output meter of the indicator unit 11 and on the phase meter 11*h*. Reconnecting the receiving station to connect the principal receiving antenna 10 to the indicator units 11 and 11*h* will thereby enable both phase shift and amplitude reading individually on the phase meter 11*h* and output meter indicator unit 11 respectively since once these systems have been neutralized in the above described manner they will remain so neutralized against vertically polarized waves and permit effectively exclusive reception of horizontally polarized waves emanating from the earth and received by the principal receiving antenna 10. Recorded detection of the phase shift of these waves against the waves generated at the transmission station 1 is permitted at the phase meter through coupling both the principal receiving antenna 10 and the transmitter 1 to the phase meter 11*h*.

It should be understood of course that the numerous types of indicator units hereinabove described may be properly and operably employed in this system in substitute for the indicator units 11 and 11*h* herein described. Numerous other modifications may be made in these systems without departing from the spirit and scope of the present invention. Such modification clearly includes removal of the vertical rod antenna 2 to an extremely remote position possibly diametrically opposite to the position indicated therefor in FIGURE 5 with a phase shifter and gain control for the output therefrom positioned immediately at the receiving station and with the transmitter coupled to the vertical rod antenna through either a local transmitter or a local transmission amplifier system if desired. Still other systems may include entirely and completely electronic control of entirely separate and distinct transmission stations operating preferably at the same frequency for the accomplishment of the method described hereinabove particularly with respect to the system of FIGURE 5.

For a more thorough understanding of the principles and the methods of the present invention and the operation of the apparatus hereinabove described attention is directed to Sheet 5 of the drawings of this specification including FIGURES 11, 12, 13, 14 and 15. Briefly, FIGURES 11 and 12 represent transitory survey paths 50 across the surface of the earth for geophysical exploration surveying with the hereinabove described system; it being understood of course that surveying by aircraft would mean flying over these transitory survey lines rather than positioning the transmitting station and the receiving station along the line. The transitory survey line 50 is also represented in FIGURE 15 wherein there is further illustrated an exemplary earth cross section including a multiplicity of varying strata 51, 52 and 53 above the sandstone, limestone, rock, shale or salt beds 54 and 55 underlying and overlying respectively an oil and/or gas accumulation 56 at any subterranean depths below the earth surface and the survey line or path, whether straight or complex arcuate or broken is desired thereon. FIGURE 13 represents a typical intensity curve for readings taken over an oil field without interference from other subterranean structures. FIGURE 14 represents phase shift curves from readings taken over an oil field in accordance with the methods of the present invention.

Now with the transmission station set up at point A on the survey path and with a receiving station set up at point B along the survey path 50 the systems are adjusted for null reading as described above. Of course, if aircraft is employed for the surveying the null adjustments are made at very high altitude and then the plane is brought down to about point A or point B to conduct surveying over the survey path at low altitude. With the transmitter so connected to a principal propagating antenna that it will emanate electromagnetic waves into the ground or with the transmitter connected to probe as illustrated and described in conjunction with FIGURE 7, for emanation of electromagnetic wave energy into the ground surveying in accordance with the principles of the present invention may be initiated. FIGURE 11 includes a transitory survey path 50 marked for conducting the survey with probe or stake antenna systems such as those of FIGURE 7 while FIGURE 12 includes a transitory survey path 50 diagrammatically marked, for illustrative purposes, for conducting the geophysical survey wtih other types of antenna systems etc. as described.

Movement of the receiver station to successive points B1, B2, B3 etc. to point $B_n$ with the transmitter station remaining fixed at point A or with the receiving station remaining fixed at point B and moving the transmitting station successively to points B1, B2, B3 etc. to the end or by simultaneously moving the transmitting station and the receiving station along the survey path preferably maintaining a substantially constant distance therebetween, phase variation curves such as the curves M and N respectively may be charted and an intensity curve such as the curve P of FIGURE 13 may be charted.

First with regard to the plotting of the phase lag variation curves M and N: If the systems are taken into an area where there is an oil field and if phase readings are taken at a few points off the structure and then are carried into the oil field with measurements taken at numerous points along the way the phase of the signal picked up from the earth will begin to lag or lead very definitely and will change most at the top of the anticline. The reason for this, so far as I have been able to discover, is that concentrations of oil or gas appearing in permeable limestones and/or sandstones or other oil bearing formations act like a dielectric layer in a gigantic condenser, the plates of which are the electrically conducting shale beds overlying and underlying the oil bearing formation. Currents set up by the inductive action of the transmission propagation antenna system circulate across these formation layers and the presence of the gigantic condenser in the earth causes a shift in the phase of these currents. To state this another way, layers of oil laying between electrically conductive shale beds form large condensers and electric currents of high frequency flowing through the subsurface and across these oil layers encounter these capacitors, hence the currents through the earth are phase shifted from originally transmitted currents according to the amount of oil present and the thickness of the oil layer which form a dielectric separation between the plates of the condenser (the changing phase shift read at the receiving station indicator is a resultant phase shift due to the combined action of the several induction processes taking place between the transmitting station, the earth and the receiving station and the phase shift caused in passing the waves over the condenser provided by the shale or the like beds and separated by the dielectric of the oil or gas accumulation). All in all, there is no particular great change in the amount of conductive shale present in the earth or in the actual source of the secondary radiation (the radiation from the earth received at the receiving station) but the phase of the secondary field varies according to the presence or absence of the dielectric layer between the conductive shale bed, namely the oil or gas accumulation and the direction of the change appears to be dependent upon the character of the bed formations.

This phase shift, or these variations in phase shift, are particularly dependent upon subterranean oil and/or gas accumulations and do not contain extensive interference effects from intervening ore deposits of conductive character such as metallic ore deposits. Another important aspect of this phase shift is that it is quite sensitive to frequency and wave form and although the general principle of the present invention and the systems and methods hereinabove described are operative over a broad range of frequencies I have found that best operating frequencies are within the range of from about 1500 kc. to about 1700 kc. With regard to wave form sensitivity I have noted that the phase shifts are best detectable and most acute if substantially all transmitted energy is emanated from the transmission station through the use of filters and the like in the amplifying stages of the transmitter and if filters of relatively narrow band pass are incorporated into the receiving station apparatus at properly selected stages thereof such as in the amplifier stages and in the first stages of the phase shifter and the indicating systems such as phase meters, output meters, cathode ray oscilloscope with or without supplementary photographic equipment, phase discriminators or like systems as described above.

The filters at the receiving station are quite important to operation in accordance with the principles of the present invention since the waves emanating from the ground at the receiving station are replete with harmonic components due to electro-chemical and other activity within the earth.

When taking intensity variation readings, it is often, usually, important that the power being radiated by the loop antenna of the receiver be very carefully controlled at a certain definite point and held there. In like manner the sensitivity of the receiver must be held at a certain point too. The former may be accomplished by a thermoamperemeter in the antenna coil. The receiver sensitivity may be controlled by means of a standard signal generator.

Continuing now with reference to FIGURES 11, 12, 13, 14 and 15, as the systems of the present invention are moved across the transitory survey path 50 to point B6, with point B6 being almost exactly the mid-point between the transmitting station and receiving station since I have found that the apparent effective point for reading in accordance with the principles of the present invention is almost exactly the mid-point between the transmitting and receiving station, there will be a sharp break in the intensity curve P and in the phase shift curves M and N. In the illustration of these drawings the several figures of Sheet 5 have been aligned for illustrative purposes and the point B6 represents the first edge encountered for the oil or gas accumulation 56. The reading break in the intensity curve, which curve is not always as accurate as the phase shift curve since interference from other subterranean conditions often seriously distort the intensity curve, should be quite sharp and include a very sharp drop following the point B6 after which the curve will sharply rise and then gradually taper off and then gradually increase to a substantially symmetrical sharp drop and sharp rise as illustrated.

Considering point B7 as subtantially the center of the oil or gas pool but more importantly as about the top of the anticline and point B8 as the trailing edge of the pool it will be observed that the edge effect of sharp variation in intensity and sharp variation in phase shift occur at points B6 and B8 while a maximum lagging phase shift occurs at point B7 and a minimum intensity between the edge effect of points B6 and B8 occurs at point B7. Having once passed out of the oil field the reading will indicate a substantially smooth, practically straight line, curve out to the points $B_n$.

The curves of FIGURES 13 and 14 have been included here principally for illustrative purposes. A preferred form of mapping in accordance with the principles of the present invention is to indicate phase shift readings and intensity readings, principally phase shift readings as they are the more important of the two types and give a truer indication of the existence of subterranean deposits or accumulations of gas and/or oil, on a topographic or similar type of map and then connecting points of equal intensity variation and equal phase shift variation with appropriate lines to outline the oil pool and to intelligently indicate on the map the general character and size of the oil and/or gas accumulation. Curves such as those of FIGURES 13 and 14 are helpful however in determining the size and quantity of the accumulation.

One principal advantage that may be gained from plotting curves such as the phase shift curves M and N of FIGURE 14 is that in some instances the general slope of the curve will vary depending upon the manner in which the readings were made and/or the type of system employed to make the curvey. In taking readings over an area such as the one shown in FIGURE 15 through the use of the airborne system, one is apt to have a resultant curve such as the curve (N). A surface system in which the spacing between the units is kept constant will give such a curve as N also. A surface system in which either the transmitter or the receiver is moved along a line away from or toward the other unit will give a curve resembling M. With curves such as the curves M and N at hand for each series of readings taken the surveyor or prospector is better equipped to plot the points of corresponding rather than identical phase shift readings joining the points B6 and B8 together in the manner described to properly outline the pool even though they would not be precisely of the same phase shift when taken along the curve M.

From the foregoing detailed description of the present invention and from the accompanying drawings which form a part of this specification, numerous modifications, and variations will readily present themselves to those skilled in the art without departing from the true novel concepts and the spirit and scope of the present invention.

I claim as my invention:

1. Geophysical surveying and prospecting apparatus comprising a transmitting station, a transmitter at said transmitting station for generating electromagnetic waves of a certain frequency, a first antenna system at said transmitting station for emanating said waves and operable to propagate a substantial portion of the same into the earth as horizontally polarized waves, a receiving station, a second antenna system at said receiving station operable to receive said waves and waves from the earth, means at said receiving station operable to effect separation of waves from the earth from waves of another polarization at said receiving station and a detector system connected to said second antenna system to indicate variations between said waves from the earth and waves emanated from said first antenna system.

2. Geophysical surveying and prospecting apparatus comprising a transmitting station, a transmitter at said transmitting station for generating electromagnetic waves of a certain frequency, a first antenna system at said transmitting station for emanating said waves and operable to propagate a substantial portion of the same into the earth as horizontally polarized waves, a receiving station, a second antenna system at said receiving station operable to receive said waves and waves from the earth, means at said receiving station operable to effect separation of waves from the earth from waves of another polarization at said receiving station and a detector system connected to said second antenna system to indicate variations between said waves from the earth and waves emanated from said first antenna system, said means including a third antenna coupled to a controllable phase shifter and amplifier to control a signal to substantially nullify waves arriving at said receiving station from said transimtting station.

3. Geophysical surveying and prospecting apparatus comprising a transmitting station, a transmitter at said transmitting station for generating electromagnetic waves of a certain frequency, a first antenna system at said transmitting station for emanating said waves and operable to propagate a substantial portion of the same into the earth as horizonally polarized waves, a receiving station, a second antenna system at said receiving station operable to receive said waves and waves from the earth, means at said receiving station operable to effect separation of waves from the earth from waves of another polarization at said receiving station and a detector system connected to said second antenna system to indiacte variations between said waves from the earth and waves emanated from said first antenna system, said means including a third antenna coupled to a controllable phase shifter and amplifier and to said detection system to control a signal to substantially nullify waves arriving at said receiving station from said transmitting station.

4. Geophysical surveying and prospecting apparatus comprising a transmitting station, a transmitter at said transmitting station for generating electromagnetic waves of a certain frequency, a first antenna system at said transmitting station for emanating said waves and operable to propagate a substantial portion of the same into the earth as horizontally polarized waves, a receiving station, a second antenna system at said receiving station operable to receive said waves and waves from the earth, means at said receiving station operable to effect separation of waves from the earth from waves of another polarization at said receiving station and a detector system connected to said second antenna system to indicate variations between said earth from the earth and waves emanated from said first antenna system said means including a third antenna coupled to a controllable phase shift and amplifier and to said transmitter to control a signal to substantially nullify waves arriving at said receiving station from said transmitting station.

5. In electrical geophysical surveying and prospecting apparatus to detect at least the relative phase of substantially sine wave signals emanated from a transmitting station and signals emanating from the earth of substantially the same frequency arriving at a receiving station, an antenna system coupled to said receiving station including a pair of symmetrical antenna arrays inductively coupled in vertical polarization and decoupled in horizontal polarization.

6. In electrical geophysical surveying and prospecting apparatus to detect at least the relative phase of substantially sine wave signals emanated from a transmitting station and signals emanating from the earth of substantially the same frequency arriving at a receiving station, an antenna system coupled to said receiving station including a pair of symmetrical antenna arrays inductively coupled in vertical polarization and decoupled in horizontal polarization, at least one of said antenna arrays being a loop antenna.

7. In electrical geophysical surveying and prospecting apparatus to detect at least the relative phase of substantially sine wave signals emanated from a transmitting station and signals from the earth of substantially the same frequency arriving at a receiving station, an antenna system coupled to said receiving station including a pair of symmetrical antenna arrays inductively coupled in vertical polarization and decoupled in horizontal polarization, said pair of symmetrical antenna arrays being substantially concentrically disposed loops.

8. In electrical geophysical surveying and prospecting apparatus to detect at least the relative phase of substantially sine wave signals emanated from a transmitting system and signals from the earth of substantially the same frequency arriving at a receiving station, an antenna system coupled to said receiving station including a pair of symmetrical antenna arrays inductively coupled in vertical polarization and decoupled in horizontal polarization, at least one of said antenna arrays being a dipole system.

9. In electrical geophysical surveying and prospecting apparatus to detect at least the relative phase of substantially sine wave signals emanated from a transmitting station and signals from the earth of substantially the same frequency arriving at a receiving station, an antenna system coupled to said receiving station including a pair of symmetrical antenna arrays inductively coupled in vertical polarization and decoupled in horizontal polarization and a third antenna coupled to one of said pair through a controllable phase shifter and amplifier.

10. In a geophysical surveying and prospecting system, a receiving system including an antenna and phase and amplitude measuring means responsive to the signal output from said antenna, a transmitting system including an antenna and a transmitter coupled thereto to cause emanation of electro-magnetic waves of a certain frequency therefrom to be picked up by said receiving antenna, the transmission of a first portion of said waves being affected by variations in the subterranean earth structure and the transmission of another portion of said waves being unaffected by variations in the subterranean earth structure, and neutralizing means for balancing out the effect of said second portion of said waves, whereby said measuring means responds only to said first portion of said waves.

11. In a geophysical surveying and prospecting system, a receiving system including an antenna and phase and amplitude measuring means responsive to the signal output from said antenna, a transmitting system including an antenna and a transmitter coupled thereto to cause emanation of electro-magnetic waves of a certain frequency therefrom to be picked up by said receiving antenna, the transmission of a first portion of said waves being affected by variations in the subterranean earth structure and the transmission of another portion of said waves being unaffected by variations in the subterranean earth structure, and neutralizing means for balancing out the effect of said second portion of said waves, whereby said measuring means responds only to said first protion of said waves, said neutralizing means including means for balancing out vertically polarized waves, whereby said measuring means responds only to horizontally polarized waves.

12. In a geophysical surveying and prospecting systems, a receiving system including an antenna and phase and amplitude measuring means responsive to the signal output from said antenna, a transmitting system including an antenna and a transmitter coupled thereto to cause emanation of electro-magnetic waves of a certain frequency therefrom to be picked up by said receiving antenna, the transmission of a first portion of said waves being affected by variations in the subterranean earth structure and the transmission of another portion of said waves being unaffected by variations in the subterranean earth structure, and neutralizing means for balancing out the effect of said second portion of said waves, whereby said measuring means responds only to said first portion of said waves, said neutralizing means including a second receiving antenna coupled to said receiving system.

13. In a geophysical surveying and prospecting system, a receiving system including an antenna and phase and amplitude measuring means responsive to the signal output from said antenna, a transmitting system including an antenna and a transmitter coupled thereto to cause emanation of electro-magnetic waves of a certain frequency therefrom to be picked up by said receiving antenna, the transmission of a first portion of said waves being affected by variations in the subterranean earth structure and the transmission of another portion of said waves being unaffected by variations in the subterranean earth structure, and neutralizing means for balancing out the effect of said second portion of said waves, whereby said measuring means responds only to said first portion of said waves, said neutralizing means including a second transmitting antenna coupled to said transmitter to cancel out said second portion of said waves.

14. In a geophysical surveying and prospecting system, a receiving system including an antenna and phase and amplitude measuring means responsive to the signal output from said antenna, a transmitting system including an antenna and a transmitter coupled thereto to cause emanation of electro-magnetic waves of a certain frequency therefrom to be picked up by said receiving antenna, the transmission of a first portion of said waves being affected by variations in the subterranean earth structure and the transmission of another portion of said waves being unaffected by variations in the subterranean earth structure, and neutralizing means for balancing out the effect of said second portion of said waves, whereby said measuring means responds only to said first portion of said waves, said neutralizing means including a direct electrical coupling from said transmitter to said receiver.

15. In a geophysical surveying and prospecting system, a receiving system including a first receiving antenna and phase and amplitude measuring means responsive to the signal output from said antenna, a transmitting system including a first transmitting antenna and a transmitter coupled thereto to cause emanation of electro-magnetic waves of a certain frequency therefrom to be picked up by said first receiving antenna, the transmission of a first portion of said waves being affected by variations in the subterranean earth structure and the transmission of another portion of said waves being unaffected by variations in the subterranean earth structure, and neutralizing means for balancing out the effect of said second portion of said waves, whereby said measuring means responds only to said first portion of said waves, said neutralizing means comprising a second transmitting antenna for transmitting vertically polarized waves, a second receiving antenna sensitive to vertically polarized waves and arranged to be selectively coupled to said measuring means, and means for adjusting the phase and amplitude of signals applied from said transmitter to said second transmitting antenna while said second receiving antenna is coupled to said measuring means to produce a null output from said measuring means, said first receiving antenna being thereafter connectable to said measuring means.

16. In a geophysical surveying and prospecting system, a receiving system including an antenna and phase and amplitude measuring means responsive to the signal output from said antenna, a transmitting system including an antenna and a transmitter coupled thereto to cause emanation of electro-magnetic waves of a certain frequency therefrom to be picked up by said receiving antenna, the transmission of a first portion of said waves being affected by variations in the subterranean earth structure and the transmission of another portion of said waves being unaffected by variations in the subterranean earth structure, and neutralizing means for balancing out the effect of said second portion of said waves while moving at least one of said systems to traverse a survey path across an earth surface plane.

References Cited in the file of this patent

UNITED STATES PATENTS

| | | |
|---|---|---|
| 1,045,575 | Lowy | Nov. 26, 1919 |
| 1,820,953 | Sundberg | Sept. 1, 1931 |
| 1,838,371 | Deardorff | Dec. 29, 1931 |
| 2,103,357 | Gerhard | Dec. 28, 1937 |
| 2,192,275 | Royer | Mar. 5, 1940 |
| 2,207,061 | Koschmieder | July 9, 1940 |
| 2,218,098 | Roberts | Oct. 15, 1940 |
| 2,220,070 | Aiken | Nov. 5, 1940 |
| 2,350,337 | Brunner | June 6, 1944 |
| 2,527,559 | Lindblad | Oct. 31, 1950 |
| 2,542,462 | Beard | Feb. 20, 1951 |
| 2,608,602 | Muffly | Aug. 26, 1952 |
| 2,623,924 | Cartier | Dec. 30, 1952 |
| 2,642,477 | Puranen et al. | June 16, 1953 |
| 2,652,530 | Davidson | Sept. 15, 1953 |
| 2,685,058 | Yost | July 27, 1954 |
| 2,753,520 | Doll | July 3, 1956 |